(12) United States Patent
Baszucki et al.

(10) Patent No.: US 12,217,346 B2
(45) Date of Patent: *Feb. 4, 2025

(54) INTEGRATED INPUT/OUTPUT (I/O) FOR A THREE-DIMENSIONAL (3D) ENVIRONMENT

(71) Applicant: Roblox Corporation, San Mateo, CA (US)

(72) Inventors: David B. Baszucki, Portola Valley, CA (US); Philippe Clavel, Belmont, CA (US); Morgan Clemens Tucker, San Francisco, CA (US)

(73) Assignee: Roblox Corporation, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/308,321

(22) Filed: Apr. 27, 2023

(65) Prior Publication Data

US 2023/0334743 A1    Oct. 19, 2023

Related U.S. Application Data

(63) Continuation of application No. 17/375,062, filed on Jul. 14, 2021, now Pat. No. 11,651,541.

(Continued)

(51) Int. Cl.
*G06T 13/40* (2011.01)
*G06F 3/04815* (2022.01)
(Continued)

(52) U.S. Cl.
CPC ............ *G06T 13/40* (2013.01); *G06T 13/205* (2013.01); *G06T 19/20* (2013.01);
(Continued)

(58) Field of Classification Search
CPC ....... G06T 13/40; G06T 13/205; G06T 19/20; G06T 2219/2004; G06F 3/04815;
(Continued)

(56) References Cited

U.S. PATENT DOCUMENTS 5,598,209 A *  1/1997  Cortjens ................. H04N 7/15
                                              348/E7.083
9,930,470 B2 * 3/2018  Reilly ................. H04R 29/008
(Continued)

FOREIGN PATENT DOCUMENTS

CN       104995662       10/2015
JP       2003-037826      2/2003
(Continued)

OTHER PUBLICATIONS

EPO, Extended European Search Report for European Patent Application No. 22155039.5, Jul. 27, 2022, 10 pages.

(Continued)

*Primary Examiner* — YuJang Tswei
(74) *Attorney, Agent, or Firm* — IP Spring

(57) ABSTRACT

Various input modes and output modes may be used for a three-dimensional (3D) environment. A user may use a particular input mode (e.g., text, audio, video, etc.) for animating a 3D avatar of the user in the 3D environment. The user may use a particular output mode (e.g., text, audio, 3D animation, etc.) in the presentation of the 3D environment. The input/output modes may change based on conditions such as a location of the user.

18 Claims, 6 Drawing Sheets

Related U.S. Application Data

(60) Provisional application No. 63/155,064, filed on Mar. 1, 2021.

(51) Int. Cl.

| | | |
|---|---|---|
| *G06F 3/16* | (2006.01) | |
| *G06T 13/20* | (2011.01) | |
| *G06T 19/20* | (2011.01) | |
| *H04L 65/1089* | (2022.01) | |
| *H04L 65/403* | (2022.01) | |
| *H04N 7/15* | (2006.01) | |

(52) U.S. Cl.
CPC .......... *G06F 3/04815* (2013.01); *G06F 3/167* (2013.01); *G06T 2203/04802* (2013.01); *G06T 2219/2004* (2013.01); *H04L 65/1089* (2013.01); *H04L 65/403* (2013.01); *H04N 7/15* (2013.01); *H04N 7/157* (2013.01)

(58) Field of Classification Search
CPC ........... G06F 3/167; G06F 2203/04802; H04L 65/1089; H04L 65/403; H04N 7/157; H04N 7/15
See application file for complete search history.

(56) References Cited

U.S. PATENT DOCUMENTS

| | | | |
|---|---|---|---|
| 10,521,946 B1 | 12/2019 | Roche et al. | |
| 11,140,360 B1 | 10/2021 | Kasaba | |
| 2008/0155632 A1 | 6/2008 | Marilly et al. | |
| 2009/0254843 A1* | 10/2009 | Van Wie | H04L 67/131 |
| | | | 707/999.005 |
| 2010/0045697 A1* | 2/2010 | Reville | G06F 3/0481 |
| | | | 345/619 |
| 2010/0083140 A1 | 4/2010 | Dawson et al. | |
| 2011/0072367 A1* | 3/2011 | Bauer | G06F 3/04815 |
| | | | 715/757 |
| 2012/0204120 A1 | 8/2012 | Lefar et al. | |
| 2012/0209933 A1* | 8/2012 | Ridges | H04L 67/131 |
| | | | 709/208 |
| 2015/0133197 A1 | 5/2015 | Kwak et al. | |
| 2016/0134840 A1 | 5/2016 | McCulloch | |
| 2017/0134821 A1* | 5/2017 | D'Amelio | H04N 21/42203 |
| 2017/0337360 A1 | 11/2017 | Gaspard et al. | |
| 2018/0098059 A1* | 4/2018 | Valdivia | G06F 3/011 |
| 2019/0313059 A1 | 10/2019 | Agarawala et al. | |
| 2019/0321725 A1 | 10/2019 | Zimring et al. | |
| 2020/0368616 A1 | 11/2020 | Delamont | |
| 2021/0012770 A1 | 1/2021 | Choudhary et al. | |
| 2021/0256261 A1 | 8/2021 | Wang et al. | |
| 2022/0150083 A1 | 5/2022 | Faulkner | |

FOREIGN PATENT DOCUMENTS

| | | |
|---|---|---|
| JP | 2004-266746 | 9/2004 |
| JP | 2004-274550 | 9/2004 |
| JP | 2012-063921 | 3/2012 |
| KR | 10-2008-0058281 | 6/2008 |

OTHER PUBLICATIONS

IPO, First Examination Report for Indian Patent Application No. 202214010731, Sep. 12, 2022, 6 pages.
JPO, Notice of Reasons for Rejection (with English translation) for Japanese Patent Application No. 2022-29442, Jun. 26, 2023, 10 pages.
Nvidia, "AI-Powered Video Conferencing with NVIDIA Maxine", Video available at https://www.youtube.com/watch?v=eFK7ly8enqM, Oct. 5, 2020, 3 pages.
USPTO, Non-final Office Action for U.S. Appl. No. 17/375,062, Jan. 19, 2022, 19 pages.
USPTO, Non-final Office Action for U.S. Appl. No. 17/375,062, Aug. 26, 2022, 27 pages.
USPTO, Final Office Action for U.S. Appl. No. 17/375,062, May 13, 2022, 29 pages.
USPTO, Notice of Allowance for U.S. Appl. No. 17/375,062, Jan. 12, 2023, 9 pages.
Vincent James, "Nvidia says its AI can fix some of the biggest problems in video calls", The Verge, available at https://www.theverge.com/2020/10/5/21502003/nvidia-ai-videoconferencing-maxine-platform-face-gaze-alignment-gans-compression-resolution, Oct. 5, 2020, 3 pages.
CNIPA, First Office Action (with English translation) for Chinese Patent Application No. 202210182907.9, Sep. 11, 2023, 16 pages.
KIPO, Office Action (with English translation) for Korean Patent Application No. 10-2022-0019520, Mar. 20, 2024, 13 pages.
JPO, Notice of Reasons for Rejection (with English translation) for Japanese Patent Application No. 2022-29442, Dec. 18, 2023, 11 pages.
CNIPA, Second Office Action (with English translation) for Chinese Patent Application No. 202210182907.9, Apr. 10, 2024, 16 pages.
JPO, Notice of Allowance (with English translation) for Japanese Patent Application No. 2022-29442, May 13, 2024, 6 pages.
CNIPA, Decision of Rejection (with English translation) for Chinese Patent Application No. 202210182907.9, Jul. 15, 2024, 10 pages.
KIPO, Notice of Allowance (with English translation) for Korean Patent Application No. 10-2022-0019520, Oct. 31, 2024, 7 pages.

* cited by examiner

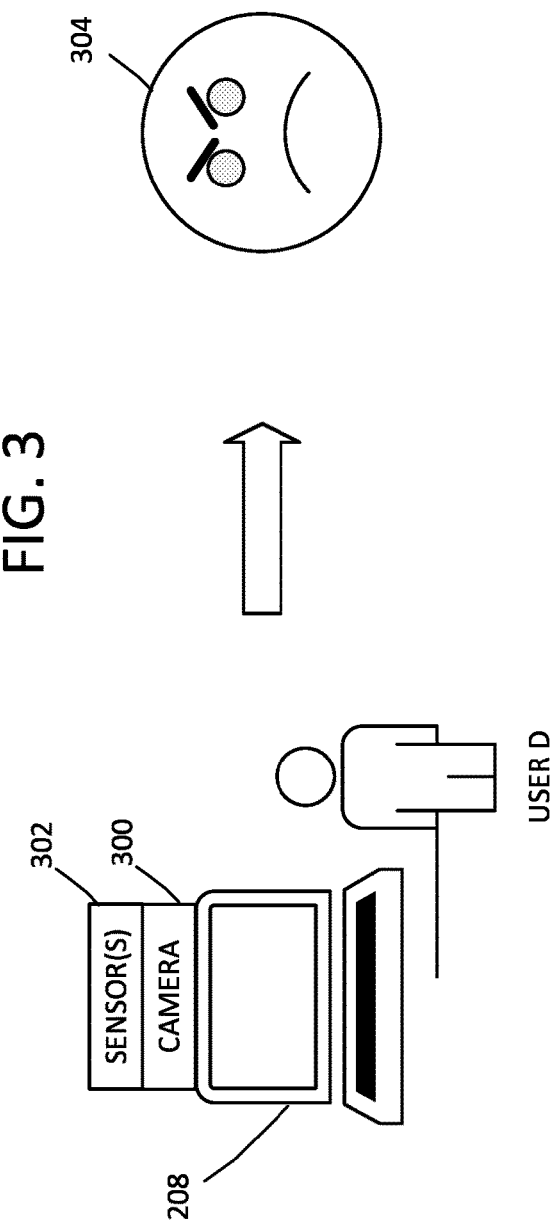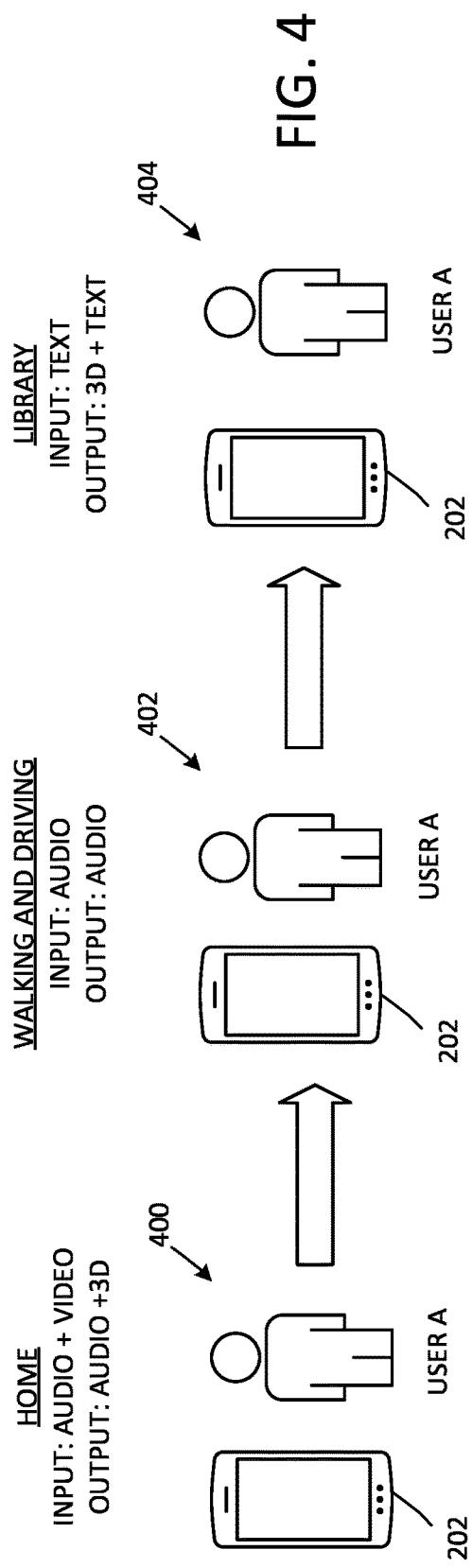

INTEGRATED INPUT/OUTPUT (I/O) FOR A THREE-DIMENSIONAL (3D) ENVIRONMENT

CROSS-REFERENCE TO RELATED APPLICATIONS

This application is a continuation of U.S. patent application Ser. No. 17/375,062, filed Jul. 14, 2021, now U.S. Pat. No. 11,651,541, and titled INTEGRATED INPUT/OUTPUT (I/O) FOR A THREE-DIMENSIONAL (3D) ENVIRONMENT, which is a non-provisional application that claims priority under 35 U.S.C. § 119 (e) to U.S. Provisional Patent Application No. 63/155,064, filed on Mar. 1, 2021, both of which are incorporated herein by reference in their entirety.

TECHNICAL FIELD

This disclosure relates generally to communications in a three-dimensional (3D) environment, and more particularly but not exclusively, to methods, systems, and computer readable media to provide multiple input/output (I/O) modes in a 3D environment.

BACKGROUND

Online video conferencing typically involves a user interface that presents thumbnail or full-screen video images of the participants, avatars of the participants, or other graphical representation of the participants. Such video conferences do not provide the participants with a fully immersive experience.

For example, it is difficult for a user/participant to remain fully engaged and interested in a conversation if the participant is simply viewing a display screen with "floating heads" and basic audio of the other participants.

Moreover, the participant's environmental surroundings and/or the type of input/output provided by the participant's user device can make it difficult for the participant to effectively participate in an online conference. For example, a participant may not have a camera on his/her user device, and so the other attendees are unable to view that participant.

SUMMARY

According to a first aspect, a method is provided to operate a three-dimensional (3D) environment. The method includes: receiving a first input signal from a first user, and using the first input signal for animation of a first avatar representative of the first user in the 3D environment, wherein the animation of the first avatar is based at least in part on a first input mode through which the first input signal is received from the first user and on emotion information provided by the first input signal; presenting the 3D environment to the first user and at least a second user, wherein presentation of the 3D environment to the first user and the at least the second user is based on respective first output modes selected by the first user and by the at least the second user; and in response to a change in location of the first user, changing an input mode of the user from the first input mode to a second input mode.

According to another aspect, a non-transitory computer-readable medium is provided that has instructions stored thereon that, responsive to execution by a processor, cause the processor to perform or control performance of operations for a three-dimensional (3D) environment. The operations include: receive a first input signal from a first user, and use the first input signal for animation of a first avatar representative of the first user in the 3D environment, wherein the animation of the first avatar is based at least in part on a first input mode through which the first input signal is received from the first user and on emotion information provided by the first input signal; present the 3D environment to the first user and at least a second user, wherein presentation of the 3D environment to the first user and the at least the second user is based on respective first output modes selected by the first user and by the at least the second user; and in response to a change in location of the first user, change an input mode of the user from the first input mode to a second input mode.

According to still another aspect, an apparatus is provided that includes: a processor; and a non-transitory computer-readable medium coupled to the processor and having instructions stored thereon that, responsive to execution by the processor, cause the processor to perform or control performance of operations for a three-dimensional (3D) environment, wherein the operations include: receive a first input signal from a first user, and use the first input signal for animation of a first avatar representative of the first user in the 3D environment, wherein the animation of the first avatar is based at least in part on a first input mode through which the first input signal is received from the first user and on emotion information provided by the first input signal; present the 3D environment to the first user and at least a second user, wherein presentation of the 3D environment to the first user and the at least the second user is based on respective first output modes selected by the first user and by the at least the second user; and in response to a change in location of the first user, change an input mode of the user from the first input mode to a second input mode.

BRIEF DESCRIPTION OF THE DRAWINGS

FIG. 3 shows an example of video as an input mode, in accordance with some implementations.

FIG. 4 shows an example of changes in input/output modes based on a location of a user, in accordance with some implementations.

DETAILED DESCRIPTION

Figure 1:
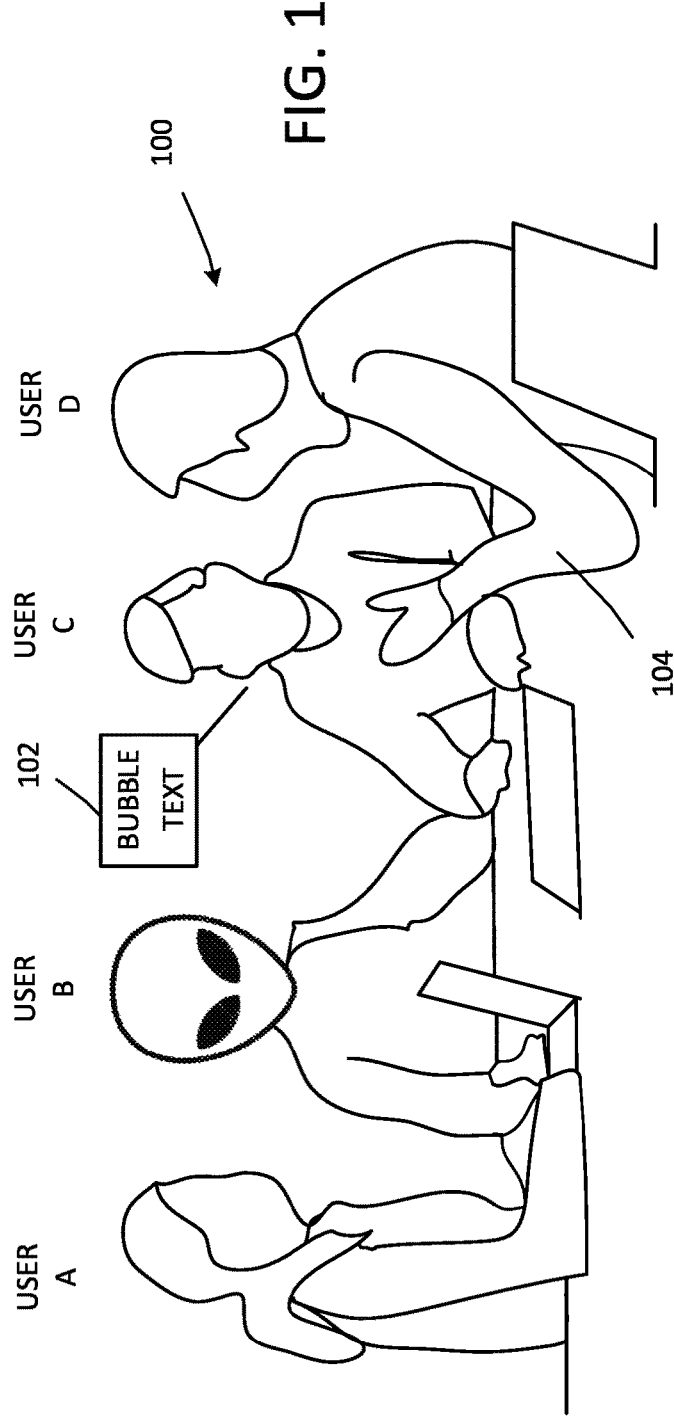
FIG. 1 shows an example 3D environment, in accordance with some implementations.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "one embodiment", "an embodiment", "an example embodiment", etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be effected in connection with other embodiments whether or not explicitly described.

The embodiments described herein address the above and other disadvantages by providing a system and method for presenting three-dimensional (3D) avatars that supports multiple input modes and multiple output modes. 3D avatars may be presented in various types of 3D environments, such as a virtual reality (VR) conference, an augmented reality (AR) setting, in an online game, or in other types of 3D environments that may include one or more users that are represented in the 3D environment by one or more 3D avatars. In the VR conferencing examples that are described herein, different users participate in a VR conference via their respective selected modes, and the system enables interoperability between the modes to create a single shared virtual conference session between users.

The system generates 3D avatars for each respective user/participant in the 3D environment (such as a VR conference), and animates each avatar based on the input provided by or sensed from the respective user. The other users can then view and/or listen to the animated avatars in the 3D environment, as if participating in an actual in-person setting. Each user may control how he/she is represented in the 3D environment (e.g., animated 3D avatar with audio, audio only, text only, image, or other format or combination thereof). Furthermore, each user may also control how the other users/participants are presented to that user in the 3D environment. For example, a first user may only wish to read text of a second user in the 3D environment, and does not wish to view an animated 3D avatar of the second user or hear audio from the second user—thus, the 3D environment presented to the first user might display only text of the second user to the first user whenever the second user speaks.

Various other example features and implementations are described next.

Referring first to FIG. 1, shown generally at 100 is an example 3D environment, in accordance with some implementations. The 3D environment 100 may comprise a computer-generated image having 3D objects. In the example of FIG. 1, the 3D environment 100 comprises a virtual reality (VR) conference having four participants (attendees), labeled as User A, User B, User C, and User D. The 3D environment 100 may be provided via other platforms, such as an augmented reality (AR) platform or other type of 3D platform. With such 3D platforms, a 3D character can be used to represent a real person who is in attendance in the conference (with the appearance of the 3D character being selectable/customizable). A 3D character or other 3D object may also be used to represent a person or thing that is not actually present in the meeting (e.g., a 3D character can be placed on an empty chair to represent a person who is not in attendance, a table that is not physically present can be a generated as a graphical 3D object for the meeting, etc.).

A 3D environment platform 200 (see, e.g., FIG. 2) generates 3D avatars for each respective user/participant in the VR conference, and animates each 3D avatar based on the input provided by or sensed from the respective user. Thus, while the users may be geographically remote and separated from each other, each user may be represented in some manner (e.g., as a 3D avatar) in the 3D environment 100. Each of the users can therefore view and/or listen to the animated 3D avatars in the VR conference, as if participating in an actual in-person conference.

The 3D avatars as presented in the 3D environment can take any form selected by its respective user. For example, User A, User C, and User D in FIG. 1 have selected their 3D avatars to take human form. The human form can in turn mimic the actual physical appearance of the user, or the user can select a different appearance for his/avatar (e.g., selecting an avatar that has the likeness of a famous actor/actress or has the appearance of some other real or imaginary person). Furthermore, such as with User B, the user can select an appearance that is not necessarily a human (e.g., an alien such as shown in FIG. 1, an animal, or other animate or inanimate object).

Still further, the 3D environment platform 200 may enable a first user to control how a second user is presented in the 3D environment 100 to the first user. For instance, User C may not like the alien appearance selected by User B. Accordingly, the 3D environment platform 200 may provide User C with capability to override the alien appearance with a human appearance. Thus, the 3D environment 100 presented to just User C can show User B in human form, while all of the other users will see User B in alien form in their respective presentation of the meeting in the 3D environment 100.

In the example meeting shown in FIG. 1, the speech spoken by User C is presented as text, such as in bubble text format 102, rather than or in addition to audio format. User C may have selected his/her speech to be presented in text to the other users, and/or one of the other users may have selected the speech of User C to be presented as text in his/her respective presentation of the meeting in the 3D environment 100.

The example view of the VR conference shown in FIG. 1 represents the form and content of what may be presented to a particular user. For instance, User A may have set his/her preferences such that the participants are all represented as animated 3D avatars, wherein at least some of the 3D avatars provide audio for their speech output. User A and/or User C may have further set his/her preferences to provide text output for User C, alternatively or additionally to audio output. Thus, while FIG. 1 shows the form and content of the meeting presented to User A in this example, each of the other users may have different form and content for the meeting respectively provided to these other users, depending on the varied input modes and output modes for the users. For instance, one of the other users may have set an output mode of "audio only", and so such user is provided with audio output from the other meeting participants and is not provided with any text or 3D animation of the other users.

The types of input modes that a user provides for the 3D environment may include but not be limited to: text, audio, video via camera tracking with text, video via camera tracking plus audio, and other formats. Examples of the types of output modes (e.g., the manner in which other participants are presented to the user in the 3D environment) available to a user may include but not be limited to: text, audio, 3D avatar animation with audio, 3D avatar animation with text (including text bubbles), still images with text and/or audio, and other formats. According to some embodiments and in addition the foregoing, the user is also able to choose the type of audio for how he/she is presented during the meeting to other participants (e.g., the user's actual voice, some other person's voice, a cartoon voice, or other synthetic voice, etc.).

VR conferencing such as that depicted in FIG. 1 is just one example of the possible implementations. In other examples implemented in 3D environments, which may not necessarily involve conferencing between multiple users, a single user may be represented by a 3D avatar in the 3D environment. The actions/audio/appearance generated by the 3D avatar may be controlled based on the input mode being used by the user (e.g., text input, camera input, etc.), and the manner in which the 3D avatar is presented to other users (who may not necessarily have their own 3D avatar involved/present in the 3D environment) can be controlled by the output mode selected by the user or selected by these other users (e.g., text, audio, language preference, etc. in combination with or alternative to just viewing the 3D avatar in the 3D environment).

For instance, a user/player of an electronic game in a 3D gaming environment may be the only player involved in the game. The spoken audio, movement, etc. of the user's 3D avatar within the game is based on the input mode (text, voice, camera, etc.) provided by the user. Meanwhile, other users may have access to the 3D gaming environment (and who may not necessarily be playing in the game) and can observe the player's progress/gameplay in the game, and these other users can observe such progress/gameplay by viewing the 3D avatar of the player, by reading text spoken by the player, listening to audio spoken by the player, and/or by being presented with some other output mode selected by these other users (and/or by being presented with the output mode specified by the player, if the player wishes to control how his/her 3D avatar is presented to the other users during the game).

In another example, a single user (3D avatar) may be a teacher giving an online lecture to student viewers who themselves are not represented by avatars in a 3D environment that presents an online lecture. Each of the students can control the output mode, so that the students can choose to read text, listen to audio, receive both text and audio, view a 3D animation of the teacher with audio and/or text, etc.

Figure 2:
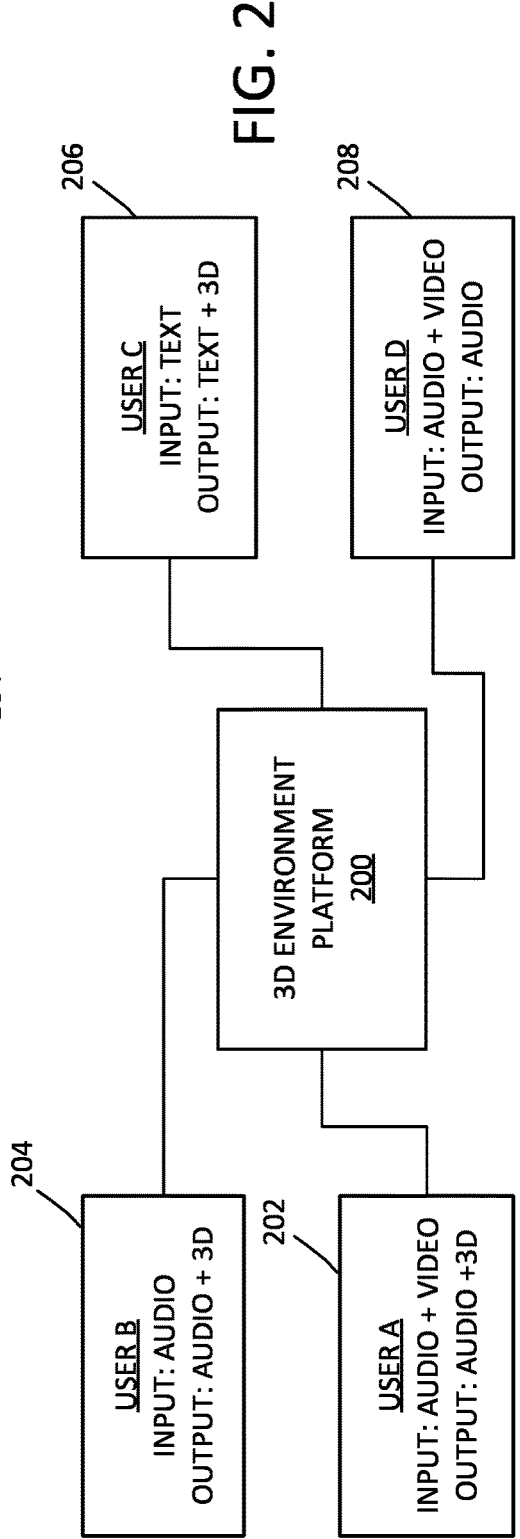
FIG. 2 shows example input modes and output modes that may be enabled for the users in the 3D environment of FIG. 1, in accordance with some implementations.

FIG. 2 shows example input modes and output modes that may be enabled for the users in the 3D environment 100 of FIG. 1, in accordance with some implementations. The input modes and/or output modes that are enabled for each user may be based on user-specified settings, capabilities of the client device of the user, the environment or other condition of the user (e.g., the location of the user, whether the user is engaged in some activity like driving or walking), and/or other parameters or combinations thereof. In FIG. 2 (which may be considered in tandem with FIG. 1), each of the Users A-D operate a respective client device 202-208, which in turn communicate with the 3D environment platform 200 during the course of a session held in the 3D environment 100 of FIG. 1.

According to the various examples of FIG. 2, User A is operating the client device 202 that supports an input mode of audio and video (and perhaps other additional input modes, such as text). For instance, the client device 202 of User A may have a microphone to capture the spoken words of User A and a camera to capture a live video of User A. Thus, audio and video may be explicitly selected by User A as the preferred input mode(s), or such input mode(s) may be automatically selected by the client device 202. In some implementations, the 3D environment platform 200 may select such input mode(s) by detecting the capabilities of the client device 202, and User A may be provided with an option to accept or override the input mode(s) selected by the 3D environment 200 or by the client device 202.

With respect to output modes, the client device 202 supports audio and 3D animation (and perhaps additional other output modes, such as text). Thus, when such output mode(s) is enabled for the client device 202 (e.g., by User A, by the client device 202, and/or by the 3D environment platform 200), User A is able to view 3D animation (along with accompanying audio) from the 3D environment 100 of FIG. 1.

The client device 202 (and/or at least some of the other client devices in FIG. 2) may thus be a smart telephone, laptop or desktop computer, VR headgear, or other electronic communication appliance with a full suite of hardware and software installed therein capable to render the 3D environment 100 on a display screen as output, along with audio, text, or other output formats, and also capable to support input modes that obtain (e.g., receive, sense, and/or interpret) user input (e.g., voice, facial expressions, body motions, emotion, etc.). Such client device(s) may also be provided with capability to allow the user to selectively enable some input/output modes and disable other input/output modes. For instance, User A may choose to disable audio output during a meeting, so that only text is presented in the 3D environment 100 being viewed by User A.

Further, the client device 202 (and/or at least some of the other client devices in FIG. 2) may be provided with other tools, such as global positioning system (GPS) tools, biometric sensors, environmental sensors, etc. that are able to determine environmental conditions, location, movement/orientation, etc. of the client device. The manner in which such tool(s) and the various input/output modes that can be used to select and subsequently modify the form and content of the 3D environment 100 (such as during the course of a meeting) will be further described later below.

The client device 204 of User B has enabled audio as the input mode, and has enabled audio and 3D animation for the output mode(s). For instance, the client device 204 may not have a camera to capture images of User B (and hence, User B has selected the alien appearance for his/her 3D avatar in the 3D environment 100) or the camera may be disabled/non-selected, but the client device 204 has a functional microphone to capture the audio of User B for use in the 3D environment 100. For the output mode(s), the client device 204 has audio and 3D animation enabled, such that User B is able to view and listen to the animated avatars in the 3D environment 100.

The client device 206 of User C has enabled text as the input mode, and has enabled text and 3D animation for the output mode(s). For instance, the client device 206 may not have a camera to capture images of User C (or the camera may be disabled/non-selected) and the client device 206 may not have a microphone (or the microphone may be disabled/non-selected), but the client device 206 has a functional text entry tool (e.g., a keyboard) that is operable by User C to provide input for use in the 3D environment 100. For the output mode(s), the client device 206 has text and 3D animation enabled (but audio is not enabled), such that User C is able to view the avatars in the 3D environment 100 and read (via text, rather than by listening) their dialog. The input/output modes shown in FIG. 2 for the client device 206, wherein audio is not enabled, may be used, for example, when User C wishes to participate in the meeting but User C is present in a library or other location where loud speaking is discouraged.

The client device 208 of User D has enabled audio and video as the input mode(s), and has enabled audio only for the output mode. For instance, User D may be driving a car while participating in the meeting. To capture the input of User D and for safety reasons, text input has been disabled for the client device 206. However, the images of User D and the speech of User D can be safely captured as input by a camera and a microphone, respectively, of the client device 208. Analogously, the output mode of the client device 208 may be set as audio only, so as to prevent distracting User B with text output or 3D animation output from the meeting while User D is driving.

Further example features and implementations are described next.

FIG. 3 shows an example of video as an input mode, in accordance with some implementations. Using the client device 208 of FIG. 2 for context, a camera 300 of the client device 208 tracks/captures the body movement (including movement of User D's mouth/lips as User D speaks), and the 3D environment platform 200 correspondingly animates the User D's avatar in the VR environment 100 based on the camera-captured movement. If User D wishes to speak (such as by raising a hand or initiating mouth/lip movement or other body cues), the camera 300 captures the "raising hand" or mouth/lips motion or other body cues, and the 3D environment platform 200 animates the 3D avatar with such body motion (such as shown at 104 in FIG. 1 wherein the 3D avatar of User D is raising a hand), thereby informing other participants that User D wishes to speak and thereby also avoiding interruptions or concurrent speakers during the meeting.

The foregoing illustrates an example wherein the user action of "raising a hand" is extrapolated as generally indicating that User D wishes to ask a question. The 3D environment platform 200 can translate/map (in real-time or near real-time) one or more of the following example actions by User D into a corresponding "raising a hand" animation of a 3D avatar: User D physically raises his/her hand, and this movement is captured by the camera 300; User D is chatting via text and types phrases such as "excuse me . . . " or "wait . . . " or "hold on . . . " that are parsed/detected by the 3D environment platform 200 and interpreted as a request by User D to speak; User D is currently muted and starts to talk and says "excuse me . . . "; etc. In a 3D virtual conference scenario (such as in a question and answer session), User D's raising of a hand signals to a currently speaking (other) user that someone else wishes to speak, and so that other user/speaker can pause to enable User D to speak.

Image and/or audio processing can also be performed to sense emotion of the user, alternatively or in addition to detection of emotion from text. For instance, if User D says "I am mad", the camera 300 detects the facial expressions or a reddened face of User D while the microphone of the client device 200 captures the audio, and audio processing is performed (at the client device 208 and/or at the 3D environment platform 200) on the audio to detect peaks in the audio volume that indicate emotional state. Biometric sensors 302 at the client device 208 can also detect increased body temperature, heart rate, or blood pressure, which are also indicative of emotional state. This detected information is processed (at the client device 208 and/or at the 3D environment platform 200) to determine whether User D is truly angry (or alternatively joking), and the 3D avatar of User D can be correspondingly animated (such as shown at 304 in FIG. 3) in real-time or near real-time, so as to represent the emotion (e.g., an angry facial expression with louder audio and lip movement that says "I am mad!"). In some embodiments, User D is also provided with an override function at the client device 208, if processing at the 3D environment platform 200 and/or at the client device 208 has misinterpreted the emotion.

As previously explained above, not all participants/users may have access to all forms of input/output modes (such as a camera or a display screen) during the course of interaction (e.g., a meeting) in the 3D environment 100. Furthermore, some input/output modes may become unavailable or impractical for use during portions of the meeting/session conducted in the 3D environment.

For instance, FIG. 4 shows an example of changes in input/output modes based on an environment (e.g., a location) or other condition of a user. User A having the client device 202 (in the form of a smart phone or other type of mobile device) is used for the example of FIG. 4. At 400, User A may be in his/her home participating in a VR conference using a camera/microphone for video and audio inputs, and using a display screen of the client device 202 to view the 3D animation of the other participants (and also using the microphone of the client device 202 to listen to the audio of the other participants).

At 402, User A walks out of the home and gets into a car and starts driving. The 3D environment platform 200 senses that User A has walked into the car and is driving (such as determined via accelerometers, GPS tools, etc. installed in the client device 202) and determines that the camera may now be an impractical input mode (for example, since User A is facing in the direction of traffic while driving, rather than looking at the camera), and so the client device 202 may disable the camera and instead uses audio from User A as the input mode (and uses the audio input to animate the User A's avatar presented to other participants in the 3D environment 100). The 3D environment platform 300 may also disable text as the input mode, due to the danger of texting while driving.

Since the user is unable to safely view a display screen of the client device 202 while driving at 402, the 3D environment platform 200 may also present the other participants' conversation to User A as audio (e.g., actual voices of the other participants and/or synthesized voices), rather than text or video via the display screen of the client device 202. In some embodiments, the other participants may generally continue to see the User A's animated 3D avatar during the entire time at 402-404 in FIG. 4, and may not know that User A has left the home and is driving (e.g., the other participants will not notice a substantive change in the 3D avatar's animation as User A shifts between home and driving environments—the change in input modes of the user may be undetectable to the other participants). In some embodiments, User A may actually want to affirmatively show to the other users that he/she (User A) has walked out of the house and is now driving. So, the 3D avatar of User A, as displayed to the other users in their respective presentation of the 3D environment, may be appropriately animated to show the 3D avatar walking, driving, etc.

At 404, User A gets out of the car and enters a quiet library where audio is discouraged. In such a case, 3D environment platform 200 uses GPS and other location/map sources to determine that the user has entered a library, and changes the output mode (e.g., how the other participants are presented to User A at the client device 202) from audio (used at 402) to 3D animation with text (e.g., using speech-to-text conversion) and with no audio at 404, or text only at 404. Also, User A's input mode for the 3D environment 100 may be changed from audio (used at 402) to text at 404, so as to enable User A to use texting for communicating with others in the 3D environment 100 while User A is within the confines of the library. The text can be parsed by the 3D environment platform 200 to create corresponding movement in User A's 3D avatar that is viewed by other participants, such as parsing words that represent emotion or body movement.

FIG. 4 illustrates the changes in input/output modes dependent on the location/environment of User A. There may also be changes in input/output modes of other participants that view/listen to User A during the 3D session. For instance, the 3D environment platform 200 may detect a change in location of a recipient user (a participant other than User A) and can automatically adjust the input/output modes for that recipient user. Continuing the present example from FIG. 4, a viewer (recipient user) of the 3D avatar of User A might walk into an environment where viewing a screen/phone may be inappropriate, such as in a dark theater. Therefore, the 3D environment platform 200 having detected that the recipient user has walked into a theater, automatically changes the output mode from a visual presentation (e.g., a 3D animation on a display screen) of User A's avatar to audio (which the recipient user can hear discretely via headphones).

Figure 5:
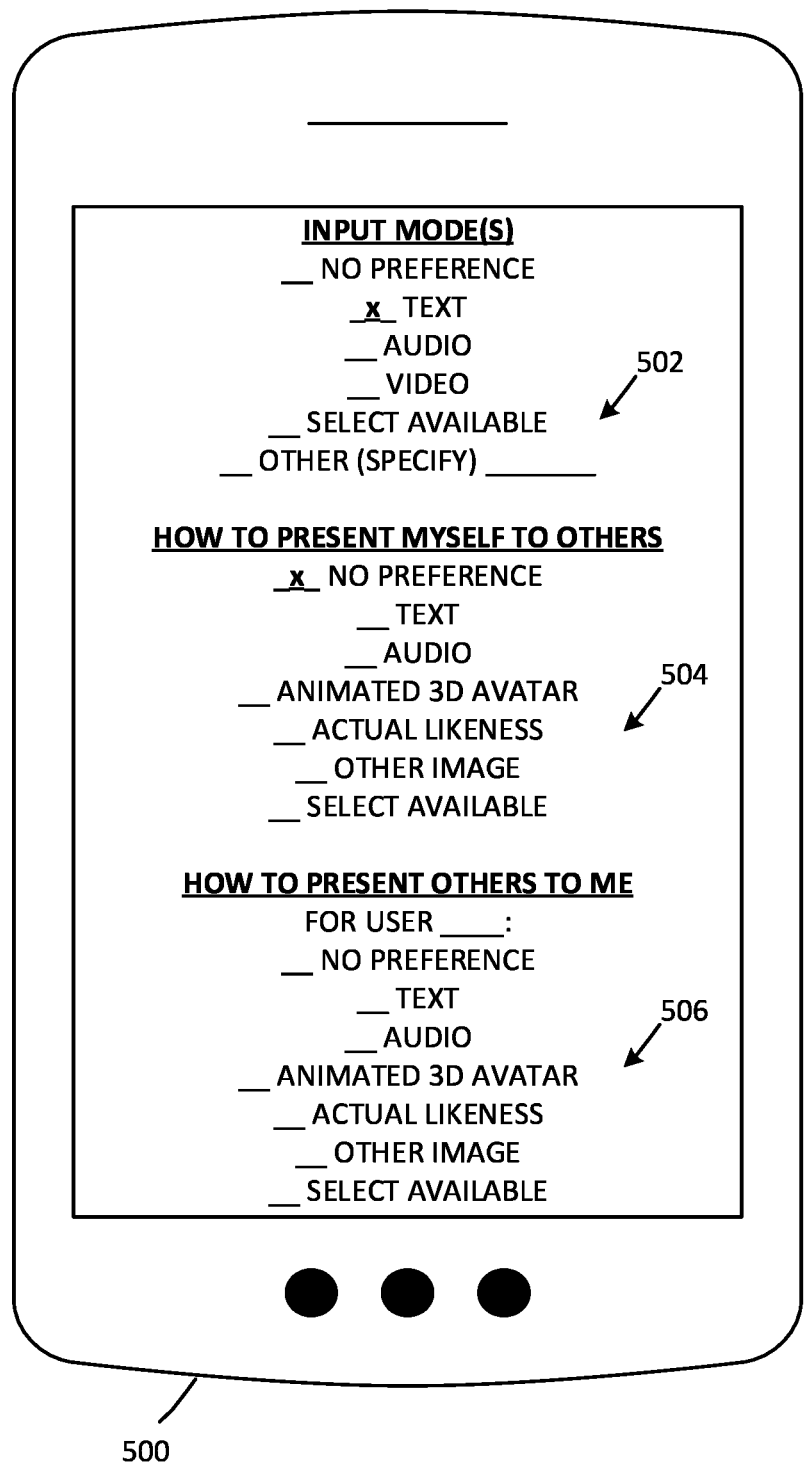
FIG. 5 shows examples of various user preferences for input/output modes, in accordance with some implementations.

The foregoing example(s) in FIG. 4 described scenarios wherein the 3D environment platform 200 automatically changed the input/output modes depending on the environment of the user. In other implementations, the input/output modes and other presentation aspects can be based on user preferences. FIG. 5 shows examples of various user preferences for input/output modes, in accordance with some implementations.

For instance, a user may use a client device 500 to enter/set preferences for input/output modes. In the example of FIG. 5, the user may select from various input mode(s) at 502, how the user wishes to present himself/herself to the other participants/attendees/users at 504, and how other participants/attendees/users are presented to the user at 506 (e.g., output modes).

With respect to input modes that are selectable at 502, the user prefers to provide input only via text (shown with an X selection at "TEXT"), with the other possible choices being NO PREFERENCE, AUDIO, VIDEO, or some OTHER input mode that may be specified. A SELECT AVAILABLE option may be provided for the input mode(s) at 502 and/or for output mode(s) at 504 and 506. For instance, a user may be playing an electronic game using a keyboard of the user's client device 500. Because the keyboard is in use for playing the game, the keyboard is unavailable to the user for texting with the friends during the game. Accordingly, the user may enable the SELECT AVAILABLE option (or the client device 500 may automatically enable this option, in response to detection of the unavailability of the keyboard for texting), such that the client device 500 activates the microphone as the input device to receive audio from the user (instead of texting by the user). The user's audio can then be displayed as text on the display screen of the client device 500 during the game, along with displaying the text from friends (e.g., if the user has selected text from friends as the output modes). Messages from the friends may alternatively or additionally be presented to the user via audio, depending on whether the user or the friend(s) has chosen audio as the output modes, whether the user's speaker on the client device 500 is enabled/available, etc.

The user may have no specific preference as to how the user is presented to other participants at 504 (shown with an X selection at "NO PREFERENCE"), with the other possible choices being TEXT, AUDIO, and ANIMATED AVATAR (with further sub-choices being ACTUAL LIKENESS or OTHER IMAGE such as an alien). With the selection of TEXT as the input mode at 502, the 3D environment platform 200 can thus use text-to-speech to convert the user's text into an animated 3D avatar with audio that is presented to other users.

At 506, the user can specify an output mode, specifically the manner in which each of the other participants may be presented to the user via the client device 500. For each of the other users (participants), the user can specify NO PREFERENCE, TEXT, AUDIO, ANIMATED 3D AVATAR (with further sub-choices being ACTUAL LIKENESS or OTHER IMAGE such as an alien). Thus, even if one of the other participants may have selected himself/herself to be presented using text only, the user of the client device 500 may be able to override/change this output mode to some other format, such as audio instead of text.

Similarly, since the particular user of the client device 500 has selected "NO PREFERENCE" (or perhaps some other format) as to how he/she is presented to others at 504, the other participants in turn may prefer to view/hear that user using an animated avatar with bubble text, audio, animated 3D avatar using an alien image with a synthesized voice, or other format(s).

In another scenario, the user may wish to change his/her avatar's appearance depending on whether the session in the 3D environment 100 is a social gathering or a business meeting. Therefore, the user can select (e.g., from a library under the choice OTHER IMAGE) at 504 a more casual avatar appearance that is viewed by other participants during a social gathering, and a more formal avatar appearance (e.g., the user wearing a suit) during a business meeting. Other 3D objects can also be rendered during the business meeting, such as a virtual whiteboard or presentation slide deck.

In some embodiments, user profile information may also be used to customize the appearance and context of avatars and other 3D objects during a session in the 3D environment 100, so as to create a more appropriate and common/shared experience during the session. For instance, if the user profiles of the participants indicate that the users are teenagers and if additional information indicates that the session in the 3D environment 100 is a class meeting, then the 3D environment platform 200 can adjust the environment and avatars so as to provide an appropriate content rating for the class meeting (e.g., adult-oriented material is redacted, non-classroom related 3D objects are excluded, etc.).

Profile information indicative of certain participants being friends may also be used by the 3D environment platform 200 to determine the animation to drive their respective 3D avatars. For instance, the body movement amongst friends is different than body movement amongst strangers or business colleagues. The 3D environment platform 200 may use such profile information and other information to appropriately animate the 3D avatars depending on the relationship between the participants and the context of the session (e.g., a VR conference) being held in the 3D environment 100.

The user profile information can include historical information about the user. Historical information can include the user's interaction with other users in previous 3D environment sessions (e.g., social, business, educational, angry, driving, texting, etc.). Different historical patterns may emerge for different users, and such historical information can be used to extrapolate or predict how to animate the user's 3D avatar, select an environment/setting for an upcoming 3D session, etc.

Access and use of the user profile information can be controlled by the user. For instance, the embodiments provide the user with capability to prevent or limit the use of their profile information in connection with generating 3D environments and 3D avatars. User permission may be required in order to use the profile information, and the user may further specify the type of profile information that may be used and the duration in which the profile information is permitted to be used. Users can also be restricted from determining the location and/or other information about other users.

The above and any other avatar or environment customization (such as represented in FIG. 5 and/or that involve user profile information) can be performed in real time. In other implementations, the 3D environment platform 200 is able to set input and/or output modes for users, without the users necessarily making a preferred selection for input/output modes.

In some example implementations, various other user actions and/or user characteristics can be extrapolated in order to generate a corresponding animation (or other type of output) for a 3D avatar. For instance, audio characteristics (such as tone, volume, etc.) of a user can be examined by the 3D environment platform 200 to determine whether the user's input needs to be translated into an output that denotes relaxation versus urgency, whether translation between different languages needs to be performed (e.g., English-to-French or vice versa, in audio and/or text). Other types of actions that can be translated by the 3D environment platform 200 into a corresponding output can include: user muting himself (and then the user's 3D avatar showing a "mute" state, such as a gag or zipper on the 3D avatar's face); the user turns off the camera and if no other input is available, then the user's 3D avatar goes into a non-animated state or some default state to indicate the user has unavailable input modes; a user takes a sip of coffee and the user's 3D avatar mimics the sip based on video input or simulates the sip based on detecting audio of the sip; a user blows his nose and the system recognizes that this action is inappropriate to represent with the 3D avatar, etc. Thus in these various examples, the 3D environment platform 200 can perform processes/algorithms to determine whether certain actions are "noise" or otherwise insufficiently significant, and can be ignored or represented in some manner.

In some embodiments, signals and information during the 3D session is encrypted by default by the 3D environment platform 200 and/or a client device. For instance, audio can be encrypted at the client device and relayed to other users during the 3D session after being decrypted at a server of the 3D environment platform 200.

Recording is also possible. The 3D session can be recorded by the 3D environment platform 200 and/or the client devices, and stored in encrypted form for later decryption and viewing.

Figure 6:
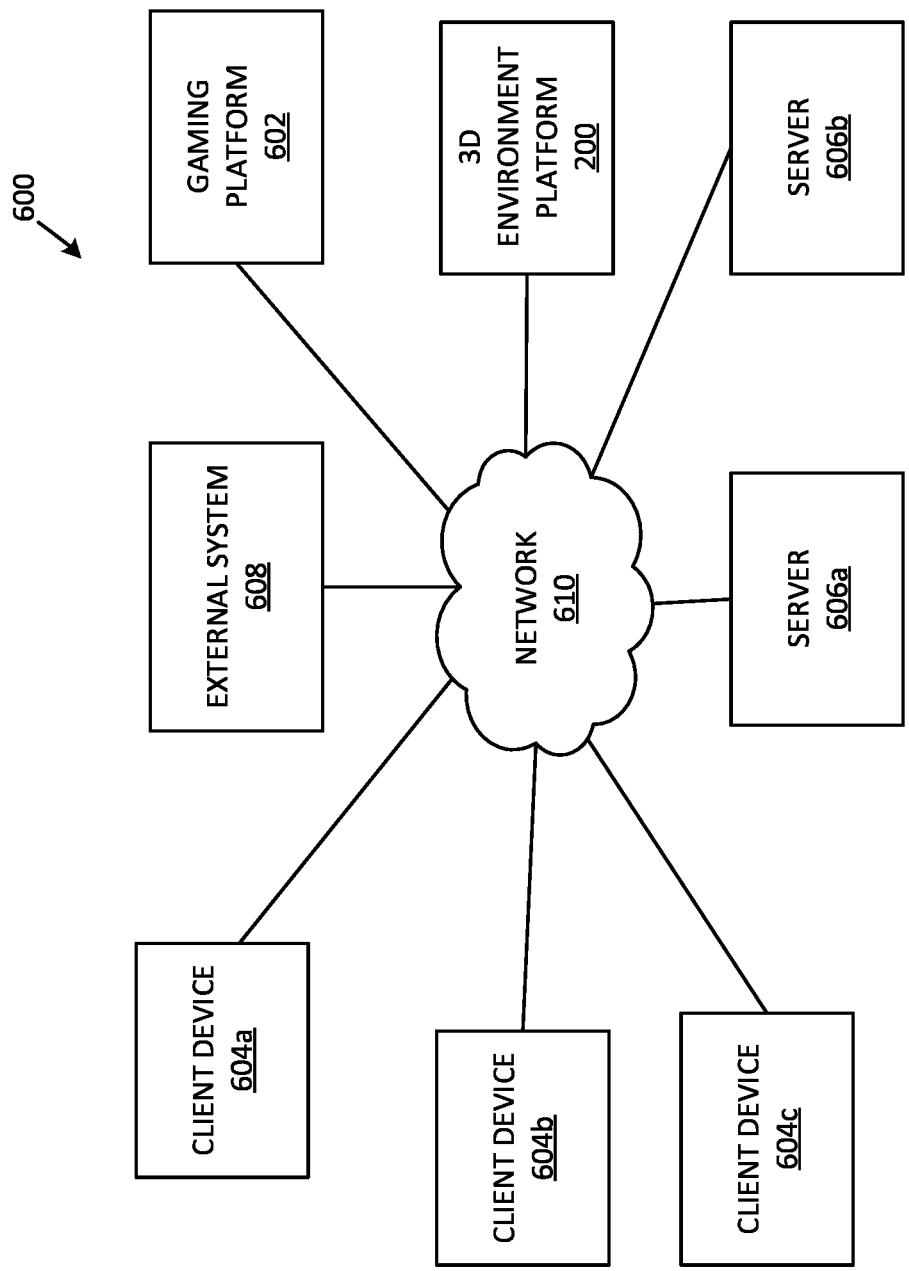
FIG. 6 is a diagram of an example system architecture that includes a 3D environment platform that can provide the 3D environment and animated 3D avatars, along with varying input/output modes, in accordance with some implementations.

FIG. 6 is a diagram of an example system architecture that includes a 3D environment platform (such as the 3D environment platform 200) that can provide a 3D environment (such as the 3D environment 100) and animated 3D avatars, along with varying input/output modes as described previously above, in accordance with some implementations. The 3D environment platform 200 (which may include or operate in conjunction with an online gaming platform 602) are also referred to as "user-generated content platforms" or "user-generated content systems" and offer a variety of ways for users to interact with one another, such as while the users are playing an electronic game or conducting an online virtual meeting. For example, users of the online gaming platform 602 may work together towards a common goal, share various virtual gaming items, send electronic messages to one another, and so forth. Users of the 3D environment platform 200 may interact in the 3D environment 100 by using characters, such as the 3D avatars described above, such as the users navigating through a 3D world rendered in an electronic game, joining together in a virtual 3D meeting, etc.

The 3D environment platform 200 may also allow users of the platform to create and animate avatars, as well as allowing the users to create other graphical objects to place in the 3D environment 100. For example, users of the 3D environment platform 200 may be allowed to create, design, and customize the avatars, and to create, design, and insert other 3D objects in the 3D environment 100.

In FIG. 6, an example system architecture 600 (also referred to as "system" herein) includes the 3D environment platform 200 (which may include the online gaming platform 602, a virtual reality (VR) platform, an augmented reality (AR) platform, an online meeting platform, and/or other type of content platform or collaborative platform), a plurality of client devices 604a-c (generally referred to as "client device(s) 604" herein), a plurality of servers 606a and 606b (generally referred to as "server(s) 606" herein) that may form part of the 3D environment platform 200, and an external system 608. The system architecture 600 is provided for illustration of one possible implementation. In other implementations, the system architecture 600 may include the same, fewer, more, or different elements configured in the same or different manner as that shown in FIG. 6.

A communication network 610 may be used for communication between the various elements in the system architecture 600. The network 610 may include a public network (e.g., the Internet), a private network (e.g., a local area network (LAN) or wide area network (WAN)), a wired network (e.g., Ethernet network), a wireless network (e.g., an 802.11 network, a Wi-Fi network, or wireless LAN (WLAN)), a cellular network (e.g., a long term evolution (LTE) network), routers, hubs, switches, server computers, or a combination thereof.

The client device 604 (which may be embodied by any of the client devices 202-208 previously described above) can include a 3D application (including a game application) and one or more user interfaces (e.g., audio/video input/output devices). The audio/video input/output devices can include one or more of a camera, microphone, speakers, headphones, display device, etc. Furthermore, the client devices 604 may include sensors, accelerometers, facial/emotion recognition software, cameras, GPS tools, and various other hardware and software components (including processing elements) usable in connection with interpreting input, environment/location, and other characteristics or conditions associated with the user. For instance, the processing elements in a client device 604 may include audio and graphical processors used for determining the user's emotion, as well as one or more processors for performing encryption, transitioning between input and output modes, and performing other operations to support 3D sessions. The sensors in the client device 604 may include accelerometers, biometric sensors, etc. In some implementations, many processing operations are performed by the client devices 604 so as to reduce the processing load at the servers 606. For instance, the processing elements in the client devices 604, in combination with data provided by the sensors, can make determinations of the emotional state of the user, automate an avatar having the emotional state, and send the generated avatar to the server(s) 606 for presentation in the 3D environment 100.

The client devices 604 can include mobile smart phones, gaming consoles, VR headsets, desktop or laptop computers, or other computing device. Depending on the type of client device used by a particular user, maximum fidelity can be provided by a VR headset; medium fidelity by a desktop/laptop computer, and minimum fidelity by a phone with text/voice-only capability, for example.

Via the network 610, the client devices 604 communicate with the servers 606 such as a first server 606*a*. The first server 606*a* performs operations such as decrypting/encrypting, receiving and processing signals (e.g., audio, video, text, etc.) from the client devices 604, and providing the processed signals to the 3D environment platform 200, for example a VR conference platform that generates a VR conference and then presents the generated VR conference (with animated avatars or other selected output modes) to the client devices 604.

The external system 608 can be a GPS system or other external information source that provides positioning information to the client devices 604 and/or to the first server 606*a* or to other servers.

A second server 606*b* can store and process business logic, profile information, and other data usable to customize a 3D environment presented by the 3D environment platform 200. For instance, the second server 606*b* can use profile information to determine whether participating users should be presented in an informal social setting (as opposed to a formal business setting) in the 3D environment 100, as well as determining which particular input/output modes to use for each client device 604.

The servers 606 may include one or more storage devices. The storage device may store, for example, graphical objects that are rendered in the 3D environment 100 by the 3D environment platform 200 or by applications locally installed in the client devices 604, as well as the configuration/properties information of the graphical objects (such as the location, color, texture, etc.). In some embodiments, the storage device can be part of a separate content delivery network that provides the graphical objects rendered by the 3D environment platform 200. For instance, the 3D environment platform 200 may pull (or have pushed to it) graphical objects stored in the storage device, for presentation during the course of a 3D session.

In one implementation, the storage device may be a non-transitory computer readable memory (e.g., random access memory), a cache, a drive (e.g., a hard drive), a flash drive, a database system, or another type of component or device capable of storing data and other content. The storage device may also include multiple storage components (e.g., multiple drives or multiple databases) that may also span multiple computing devices (e.g., multiple server computers).

In some implementations, the 3D environment platform 200 can include a server having one or more computing devices (e.g., a cloud computing system, a rackmount server, a server computer, cluster of physical servers, etc.). In some implementations, a server (such as the server 606) may be included in the 3D environment platform 200, be an independent system, or be part of another system or platform.

In some implementations, the 3D environment platform 200 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the 3D environment platform 200 and to provide a user with access to the 3D environment platform 200. The 3D environment platform 200 may also include a website (e.g., a webpage) or application back-end software that may be used to provide a user with access to content provided by online the 3D environment platform 200. For example, a user may access the 3D environment platform 200 using an application installed on the client device 604.

In some implementations, the 3D environment platform 200 may be a type of social network providing connections between users or a type of user-generated content system that allows users (e.g., end-users or consumers) to communicate with other users on the 3D environment platform 200, where the communication may include voice chat (e.g., synchronous and/or asynchronous voice communication), video chat (e.g., synchronous and/or asynchronous video communication), or text chat (e.g., synchronous and/or asynchronous text-based communication). In some implementations of the disclosure, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user."

In some implementations, the 3D environment platform 200 may be a virtual gaming platform (e.g., the gaming platform 602). For example, the gaming platform may provide single-player or multiplayer games to a community of users that may access or interact with games using client devices 604 via the network 610. In some implementations wherein the 3D environment platform 200 provides games, the games (also referred to as "video game," "online game," or "virtual game" etc. herein) may be two-dimensional (2D) games, three-dimensional (3D) games (e.g., 3D user-generated games), virtual reality (VR) games, or augmented reality (AR) games, for example. In some implementations, users may participate in gameplay with other users. In some implementations, a game may be played in real-time with other users of the game.

In some implementations, gameplay may refer to interaction of one or more players using client devices (e.g., the client device 604*a-c*) within a game or the presentation of the interaction on a display or other user interfaces of a client device 604.

In some implementations, a game or other 3D implementation can include an electronic file that can be executed or loaded using software, firmware or hardware configured to present the game content (e.g., digital media item) to an entity.

It may be noted that 3D environments or 3D worlds use graphics that provide a three-dimensional representation of geometric data representative of objects such as game content (or at least present objects to appear as 3D content whether or not 3D representation of geometric data is used). 2D environments or 2D worlds use graphics that provide two-dimensional representation of geometric data representative of objects/content.

In some implementations, the 3D environment platform 200 can host one or more games or other types of 3D sessions, and can permit users to interact with the 3D sessions using an application installed on the client device 604. Users of the 3D environment platform 200 may play in, create, interact with, or build 3D environments, communicate with other users, and/or create and build objects (e.g., also referred to as "item(s)" or "objects" or "virtual game item(s)" or "graphical objects" herein) for 3D environments. For example, in generating user-generated virtual items, users may create characters, animation for the characters, decoration for the characters, one or more virtual environments for an interactive 3D session, or build structures used in the 3D environment 100, among others. In some implementations, users may buy, sell, or trade 3D virtual objects, such as in-platform currency (e.g., virtual currency), with other users of the 3D environment platform 200. In some implementations, the 3D environment platform 200 may transmit 3D content to applications (e.g., a game application or a virtual meeting application). In some implementations, 3D content (also referred to as "content" herein) may refer to any data or software instructions (e.g., game objects, game, user information, video, images, commands, media item, etc.) associated with the 3D environment platform 200. In some implementations, 3D objects (e.g., also referred to as "item(s)" or "objects" or "virtual game item(s)" herein) may refer to objects that are used, created, shared, or otherwise depicted in the 3D environment 100 of the 3D environment platform 200. For example, 3D objects may include a part, model, character or components thereof (like faces, arms, lips, etc.), tools, weapons, clothing, buildings, vehicles, currency, flora, fauna, components of the aforementioned (e.g., windows of a building), and so forth.

It may be noted that the 3D environment platform 200, hosting the 3D environment 100, is provided for purposes of illustration. In some implementations, the 3D environment platform 200 may host one or more media items that can include communication messages from one user to one or more other users. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, the 3D environment 100 may be associated with a particular user or a particular group of users (e.g., a private game), or made widely available to users of the 3D environment platform 200 (e.g., a public 3D environment). In some implementations, where the 3D environment platform 200 associates one or more 3D environments with a specific user or group of users, the 3D environment platform 200 may associate the specific user(s) with a 3D environment using user account information (e.g., a user account identifier such as username and password).

In some implementations, the 3D environment platform 200 or client devices 604 may include applications. In some implementations, such application(s) may be used for the development or execution of 3D environments. For example, an application may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the application may generate commands that help compute and render the 3D environment (e.g., rendering commands, collision commands, animation commands, physics commands, etc.) In some implementations, the applications of client devices 604 may work independently, in collaboration with the 3D environment platform 200, or a combination of both.

In some implementations, both the 3D environment platform 200 and client devices 604 execute an application (including an engine). The 3D environment platform 200 using an engine may perform some or all the functions (e.g., generate physics commands, animation commands, rendering commands, etc., including controlling the changes input/output modes described above), or offload some or all the functions to the client device 604. In some implementations, each 3D environment may have a different ratio between the engine functions that are performed on the 3D environment platform 200 and the functions that are performed on the client devices 604.

Users may be interacting in a 3D environment using controls on client devices 604, and may send control instructions (e.g., user input) to the 3D environment platform 200. Subsequent to receiving control instructions from the client devices 604, the 3D environment platform 200 may send instructions or information to the client devices 604 based on control instructions. In other instances, the 3D environment platform 200 may pass one or more or the control instructions from one client device 604a to other client devices (e.g., the client device 604b) participating in the 3D session. The client devices 604a and 604b may use the instructions and render the 3D environment for presentation on the displays of client devices 604a and 604b, including enabling the input/output modes as described above.

In some implementations, a user may login to the 3D environment platform 200 via an application on the user device. The user may access a user account by providing user account information (e.g., username and password) where the user account is associated with one or more characters available to participate in one or more 3D environments provided by the 3D environment platform 200.

In general, functions described in various implementation as being performed by the 3D environment platform 200 can also be performed by the client device(s) 604, or a server, in other implementations if appropriate. In addition, the functionality attributed to a particular component can be performed by different or multiple components operating together. The online 3D environment platform 200 can also be accessed as a service provided to other systems or devices through appropriate application programming interfaces (APIs), and thus is not limited to use in websites.

Figure 7:
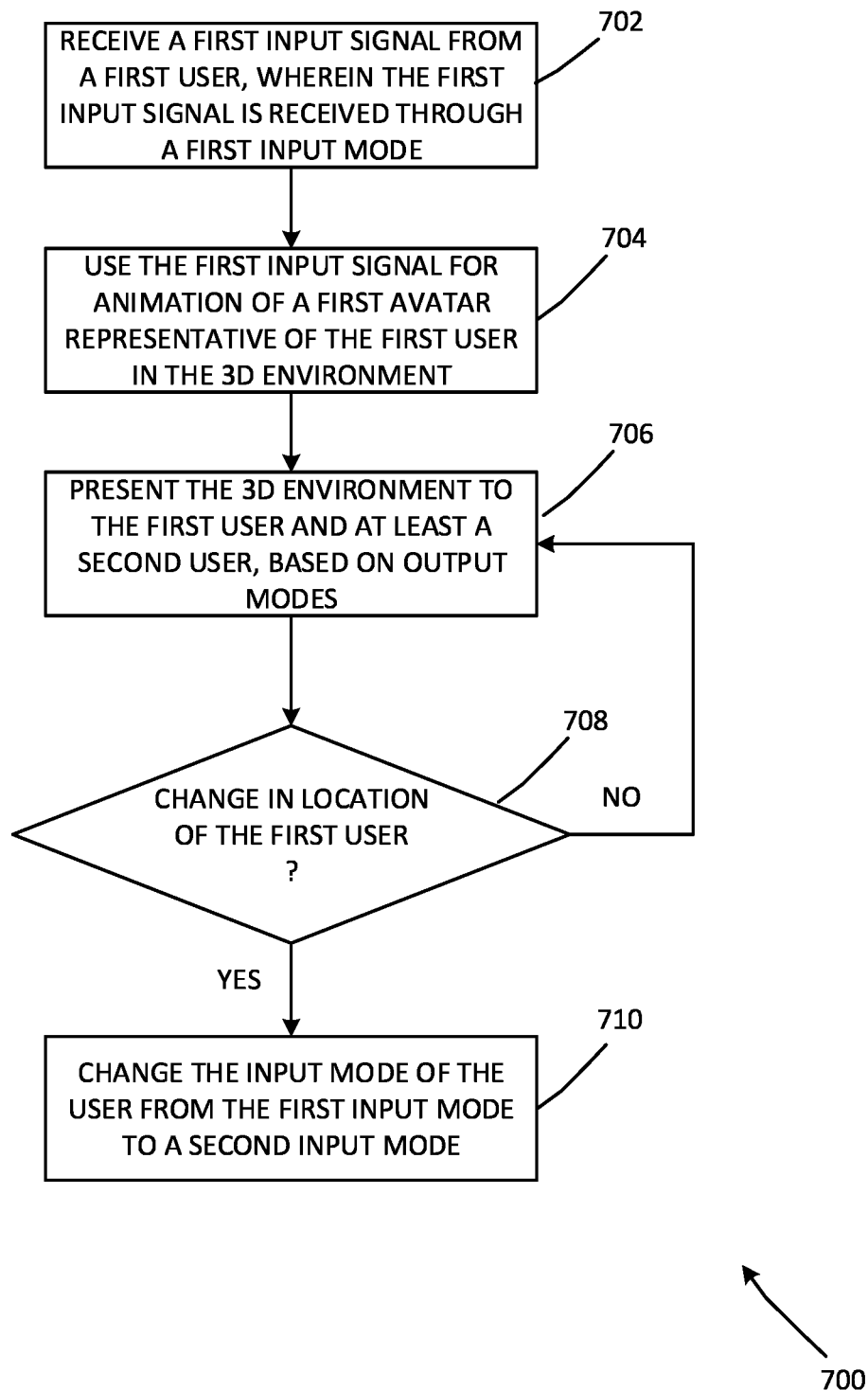
FIG. 7 is a flowchart illustrating a method to operate a 3D environment using varying input/output modes, in accordance with some implementations.

FIG. 7 is a flowchart illustrating a method 700 to operate a 3D environment (such as the 3D environment 100) using varying input/output modes, in accordance with some implementations. For the sake of simplicity, the various operations in the method 700 will be described in the context of the 3D environment platform 200 performing the operations. However, and as previously described above with respect to FIG. 6, some of the operations may be performed alternatively or additionally, in whole or in part, by the client devices 604. The example method 700 may include one or more operations illustrated by one or more blocks, such as blocks 702 to 710. The various blocks of the method 700 and/or of any other process(es) described herein may be combined into fewer blocks, divided into additional blocks, supplemented with further blocks, and/or eliminated based upon the desired implementation.

The method 700 of FIG. 7 can be explained herein with reference to the elements shown in FIGS. 1-6. In one embodiment, the operations of the method 700 may be performed in a pipelined sequential manner. In other embodiments, some operations may be performed out-of-order, in parallel, etc.

At a block 702 ("RECEIVE A FIRST INPUT SIGNAL FROM A FIRST USER, WHEREIN THE FIRST INPUT SIGNAL IS RECEIVED THROUGH A FIRST INPUT MODE"), the 3D environment platform 200 receives an input signal from a first user (such as User A at client device 202). The input signal is received through a first input mode of the client device 202. For instance, if the input mode is video and audio, the first input signal includes images of the user captured by the camera 200 and audio of the user captured by a microphone. The first input signal may also contain emotion information, such as images/sounds of User A from which the emotion of User A can be derived or the first input signal may contain the emotion of the user as derived by processing elements. The block 702 may be followed by a block 704.

At the block 704 ("USE THE FIRST INPUT SIGNAL FOR ANIMATION OF A FIRST AVATAR REPRESENTATIVE OF THE FIRST USER IN THE 3D ENVIRONMENT"), the 3D environment platform 200 uses the first input signal for animation of the 3D avatar of User A. For instance, the first input signal may contain audio information wherein the user is saying "I am mad" and the first input signal may also contain emotion information that further indicates that User A is angry. Thus, the 3D environment platform 200 uses such information from the first input signal to animate the lips/mouth/body of the 3D avatar of User A to mimic anger, along with saying "I am mad" with an angry/elevated tone of voice and with a reddened face of the 3D avatar. The block 704 may be followed by a block 706.

At the block 706 ("PRESENT THE 3D ENVIRONMENT TO THE FIRST USER AND AT LEAST A SECOND USER, BASED ON OUTPUT MODES"), the 3D environment platform 200 presents the 3D environment (having the animated 3D avatar of the User A and other users) to the first user and any other users/participants in the 3D environment 100. This presentation may be based on the output modes that are enabled for each of the users. For instance, one user may have enabled text only as his/her output mode, and is therefore presented with "I am mad" text and is not presented with audio and/or 3D animation. The various other users may have other output modes respectively selected for themselves, such as text only, audio only, avatar animation with audio, and avatar animation with text. The block 706 may be followed by the block 708.

At the block 708 ("CHANGE IN LOCATION OF THE FIRST USER?"), the 3D environment platform 200 determines whether the location of the first user has changed. If there is no change ("NO" at the block 708), then the presentation of the 3D environment 100 continues at block 706 with its current form/content relative to User A.

If, however at the block 708, the location of User A has changed ("YES" at the block 708), then the 3D environment platform 200 changes the input mode of User A as appropriate, at a block 710 ("CHANGE THE INPUT MODE OF THE USER FROM THE FIRST INPUT MODE TO A SECOND INPUT MODE"). For example and with reference to FIG. 4 previously described, the input mode of User A may be changed while User A is driving, is in a library, etc. The output mode for User A may also be changed at the block 710.

The method 700 then continues in a manner similar to blocks 702-708.

Figure 8:
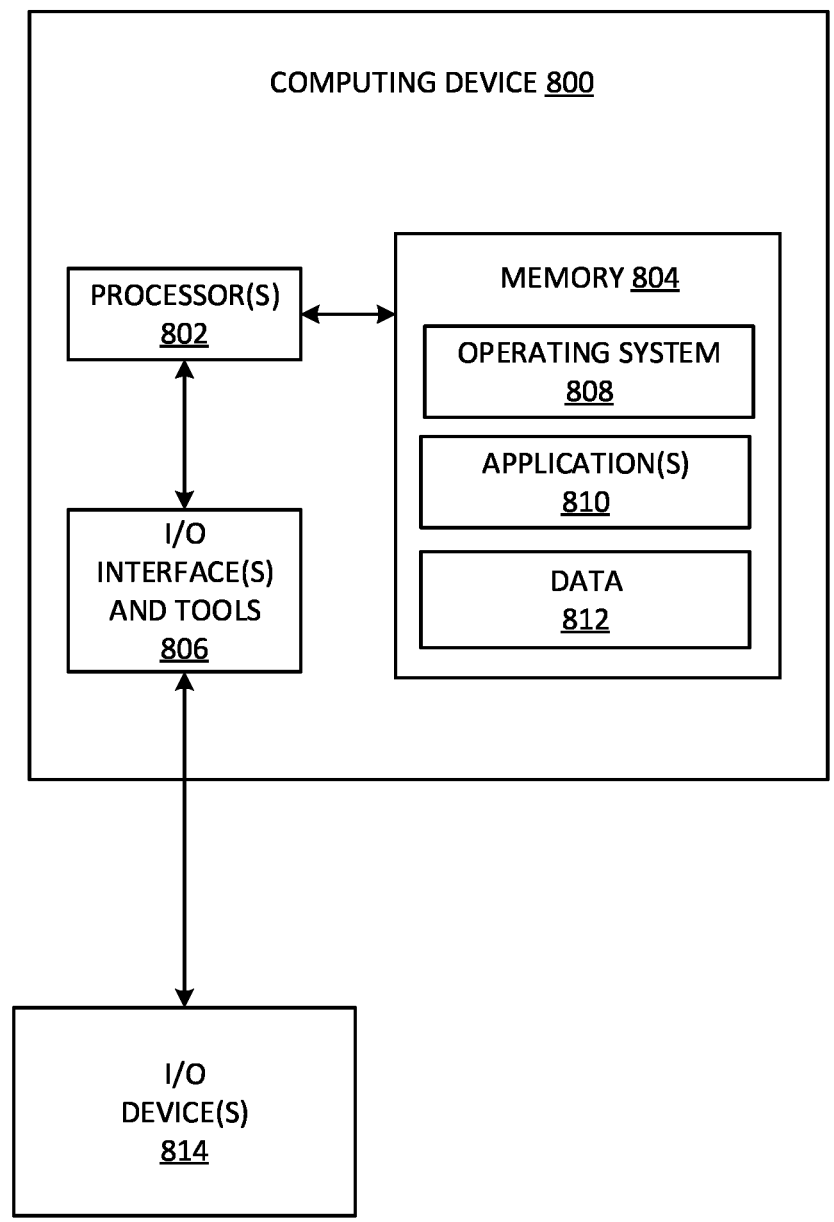
FIG. 8 is a block diagram illustrating an example computing device, in accordance with some implementations.

FIG. 8 is a block diagram of an example computing device 800 which may be used to implement one or more features described herein. The client devices 604 (including client devices 202-208) and/or the 3D environment platform 200 may be provided in the form of the computing device 800 of FIG. 8. In one example, the computing device 800 may be used to perform the methods described herein. The computing device 800 can be any suitable computer system, server, or other electronic or hardware device. For example, the computing device 800 can be a mainframe computer, desktop computer, workstation, portable computer, or electronic device (portable device, mobile device, cell phone, smartphone, tablet computer, television, TV set top box, personal digital assistant (PDA), media player, game device, wearable device, etc.). In some implementations, the device 800 includes a processor 802, a memory 804, an input/output (I/O) interface and tools 806, and input/output (I/O) devices 814.

The processor 802 can be one or more processors and/or processing circuits to execute program code and control basic operations of the computing device 800. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

The memory 804 may be provided in the computing device 800 for access by the processor 802, and may be any suitable processor-readable storage medium, e.g., random access memory (RAM), read-only memory (ROM), electrical erasable read-only memory (EEPROM), flash memory, etc., suitable for storing instructions for execution by the processor, and located separate from processor 802 and/or integrated therewith. The memory 804 can store software executable on the computing device 800 by the processor 802, including an operating system 808, one or more applications 810 and its related data 812. The application 810 can be used to cooperate with the 3D environment platform 200 to generate a 3D environment with 3D avatars, as well as enabling the various input/output modes as described herein. In some implementations, the application 810 can include instructions that, in response to execution by the processor 802, enable the processor 802 to perform or control performance of the operations described herein with respect to using input/output modes in a 3D environment.

Any of software in the memory 804 can alternatively be stored on any other suitable storage location or computer-readable medium. In addition, memory 804 (and/or other connected storage device(s)) can store instructions and data used in the features described herein. The memory 804 and any other type of storage (magnetic disk, optical disk, magnetic tape, or other tangible media) can be considered "storage" or "storage devices."

The I/O interface and tools 806 can provide functions to enable interfacing the computing device 800 with other systems and devices. For example, network communication devices, storage devices, and input/output devices can communicate with the computing device 800 via an I/O interface and tools 806. In some implementations, the I/O interface and tools 806 can connect to interface devices including input devices (keyboard, pointing device, touchscreen, microphone, camera, scanner, etc.) and/or output devices (display device, speaker devices, printer, motor, etc.), which are collectively shown as at least one input/output device 618. The tools 806 may further include GPS tools, sensor tools, accelerometers, etc. that may communicate with other components of the computing device 800 or with components external thereto.

The input/output devices 814 can include an audio input device (e.g., a microphone, etc.) that can be used to receive audio messages as input, an audio output device (e.g., speakers, headphones, etc.) and/or a display device, that can be used to provide graphical and visual output described above. The input/output devices 814 can also include keyboards, cameras, and other devices capable to provide the various input/output modes described herein.

For ease of illustration, FIG. 8 shows one block for each of processor 802, memory 804, I/O interface and tools 806, the application 810, etc. These blocks may represent one or more processors or processing circuitries, operating systems, memories, I/O interfaces, applications, and/or software modules. In other implementations, the device 600 may not have all of the components shown and/or may have other elements including other types of elements instead of, or in addition to, those shown herein.

A user device can also implement and/or be used with features described herein. Example user devices can be computer devices including some similar components as the computing device 800, e.g., processor(s) 802, memory 804, and I/O interface and tools 806. An operating system, software and applications suitable for the client device can be provided in memory and used by the processor. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device within the audio/video input/output devices 814, for example, can be connected to (or included in) the device 800 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., the method 700) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g., field-programmable gate array (FPGA), complex programmable logic device), general purpose processors, graphics processors, application specific integrated circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A method to operate a three-dimensional (3D) environment, the method comprising:
   receiving a first input signal from a first user, and using the first input signal for animation of a first avatar representative of the first user in the 3D environment, wherein the animation of the first avatar is based at least in part on a first input mode through which the first input signal is received from the first user;
   presenting the 3D environment to the first user and to a second user during a 3D session, wherein presentation of the 3D environment during the 3D session to the first user and to the second user is based on respective first output modes selected by the first user and by the second user, wherein a first appearance of the first avatar during the 3D session is based on a setting chosen by the first user for presentation of the first avatar in the 3D environment to the second user, and wherein the first output mode selected by the second user overrides the setting chosen by the first user for presentation of the first avatar, so as to present the first avatar to the second user with a second appearance during the 3D session that is different from the first appearance;

in response to a change in a physical location of the first user, changing an input mode of the first user from the first input mode to a second input mode;

in response to the change in the physical location of the first user, changing the first output mode selected by the first user from the first output mode to a second output mode that is usable in the changed physical location while the first output mode is disabled; and in response to a change in a physical location of the second user, changing the first output mode selected by the second user from the first output mode selected by the second user to some other output mode that is usable in the changed physical location of the second user and further based on capabilities of a device of the second user.

2. The method of claim 1, wherein the other output mode disables a visual presentation of the second appearance of the first avatar and of the 3D environment on the device of the second user, and presents output from the first user to the second user as text-only or audio-only on the device of the second user.

3. The method of claim 1, wherein:
the first input mode of the first user is text input,
the second input mode which has been changed from the first input mode in response to the change in the physical location of the first user, is video input or audio input, and
the first input mode is disabled in response to the change in the physical location of the first user.

4. The method of claim 1, wherein:
the first input mode of the first user is audio input, and
the second input mode, which has been changed from the first input mode in response to the change in the physical location of the first user, is text input.

5. The method of claim 1, wherein the change in physical location of the first user is detected by a global positioning system (GPS) tool on a device of the first user.

6. The method of claim 1, wherein the animation of the first avatar is further based in part on emotion of the first user as determined by a sensor on a device of the first user.

7. An apparatus, comprising:
a processor; and
a non-transitory computer-readable medium coupled to the processor and having instructions stored thereon that, responsive to execution by the processor, cause the processor to perform or control performance of operations for a three-dimensional (3D) environment, wherein the operations comprise:
receive a first input signal from a first user, and use the first input signal for animation of a first avatar representative of the first user in the 3D environment, wherein the animation of the first avatar is based at least in part on a first input mode through which the first input signal is received from the first user;
present the 3D environment to the first user and to a second user during a 3D session, wherein presentation of the 3D environment during the 3D session to the first user and to the second user is based on respective first output modes selected by the first user and by the second user, wherein a first appearance of the first avatar during the 3D session is based on a setting chosen by the first user for presentation of the first avatar in the 3D environment to the second user, and wherein the first output mode selected by the second user overrides the setting chosen by the first user for presentation of the first avatar, so as to present the first avatar to the second user with a second appearance during the 3D session that is different from the first appearance;

in response to a change in a physical location of the first user, change an input mode of the first user from the first input mode to a second input mode;

in response to the change in the physical location of the first user, change the first output mode selected by the first user from the first output mode to a second output mode that is usable in the changed physical location while the first output mode is disabled; and in response to a change in a physical location of the second user, changing the first output mode selected by the second user from the first output mode selected by the second user to some other output mode that is usable in the changed physical location of the second user and further based on capabilities of a device of the second user.

8. The apparatus of claim 7, wherein the other output mode disables a visual presentation of the second appearance of the first avatar and of the 3D environment on the device of the second user, and presents output from the first user to the second user as text-only or audio-only on the device of the second user.

9. The apparatus of claim 7, wherein:
the first input mode of the first user is text input,
the second input mode which has been changed from the first input mode in response to the change in the physical location of the first user, is video input or audio input, and
the first input mode is disabled in response to the change in the physical location of the first user.

10. The apparatus of claim 7, wherein:
the first input mode of the first user is audio input, and
the second input mode, which has been changed from the first input mode in response to the change in the physical location of the first user, is text input.

11. The apparatus of claim 7, wherein the change in the physical location of the first user is detected by a global positioning system (GPS) tool on a device of the first user.

12. The apparatus of claim 7, wherein the animation of the first avatar is further based in part on emotion of the first user as determined by a sensor on a device of the first user.

13. A method to operate a three-dimensional (3D) environment, the method comprising:
receiving a first input signal from a first user, and using the first input signal for animation of a first avatar representative of the first user in the 3D environment, wherein the animation of the first avatar is based at least in part on a first input mode through which the first input signal is received from the first user;
presenting the 3D environment to the first user and to second, third, and fourth users at runtime during a 3D session, wherein the runtime presentation of the 3D environment during the 3D session to the first user and to the second, third, and fourth users is based on respective first output modes selected by the first user and by the second, third, and fourth users,
wherein a first appearance of the first avatar during the 3D session is based on a setting chosen by the first user for presentation of the first avatar in the 3D environment to the second, third, and fourth users, wherein the first output mode selected by the second user overrides the setting chosen by the first user for presentation of the first avatar, so as to present the first avatar to the second user with a second appearance during the 3D session that is different from the first appearance, wherein the first output mode selected by the third user overrides the setting chosen by the first user for presentation of the first avatar, so as to present the first avatar to the third user with a third appearance during the 3D session that is different from the first and second appearances, wherein the first output mode selected by the fourth user presents the first avatar to the fourth user with the first appearance during the 3D session, and wherein the first, second, and third appearances of the first avatar are presented concurrently, in the runtime presentation of the 3D environment during the 3D session, to the fourth, second, and third users, respectively;

in response to a change in a location of the first user, changing an input mode of the first user from the first input mode to a second input mode;

in response to the change in the location of the first user, changing the first output mode selected by the first user from the first output mode to a second output mode that is usable in the changed location while the first output mode is disabled; and in response to a change in a location of the second user, changing the first output mode selected by the second user from the first output mode selected by the second user to some other output mode that is usable in the changed location of the second user and further based on capabilities of a device of the second user.

14. The method of claim 13, wherein the animation of the first avatar is further based in part on emotion of the first user as determined by a sensor on a device of the first user.

15. The method of claim 13, wherein the change in the location of the first user is a change in a physical location of the first user.

16. The method of claim 13, wherein:

the first input mode of the first user is text input, the second input mode which has been changed from the first input mode in response to the change in the location of the first user, is video input or audio input, and the first input mode is disabled in response to the change in the location of the first user.

17. The method of claim 13, wherein:

the first input mode of the first user is audio input, and the second input mode, which has been changed from the first input mode in response to the change in the location of the first user, is text input.

18. The method of claim 13, wherein the change in the location of the first user is detected by a global positioning system (GPS) tool on a device of the first user.

* * * * *